April 2, 1935.   P. R. DRENNING   1,996,644
BOLSTER FOR PLANKLESS TRUCKS
Filed Aug. 25, 1931   2 Sheets-Sheet 1
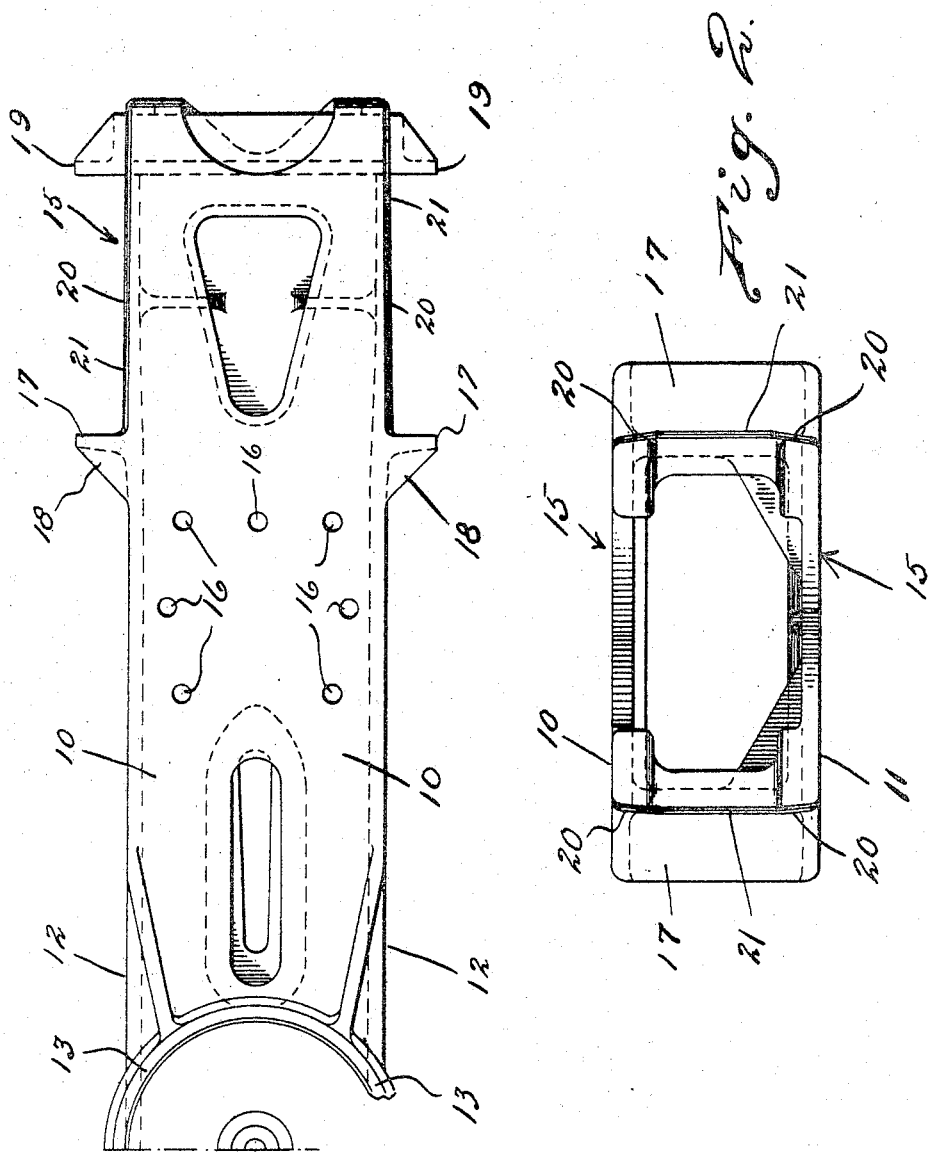
Percy R. Drenning
INVENTOR
BY John Milton Jester
ATTORNEY April 2, 1935.  P. R. DRENNING  1,996,644
BOLSTER FOR FLANKLESS TRUCKS
Filed Aug. 25, 1931  2 Sheets-Sheet 2
Fig. 3
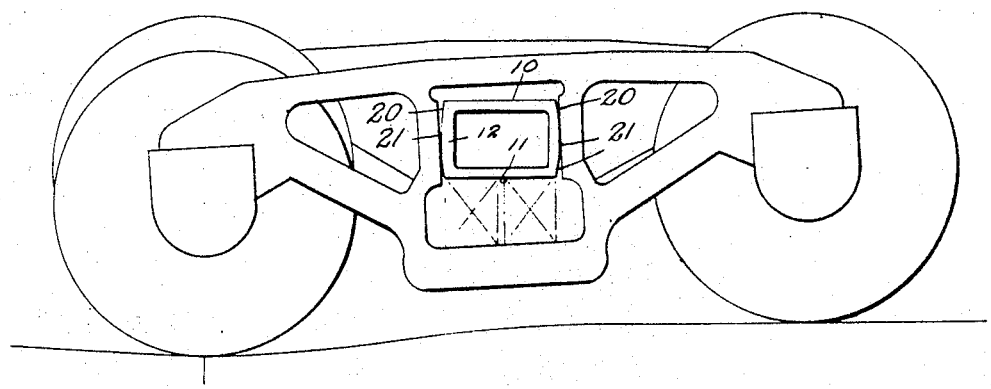
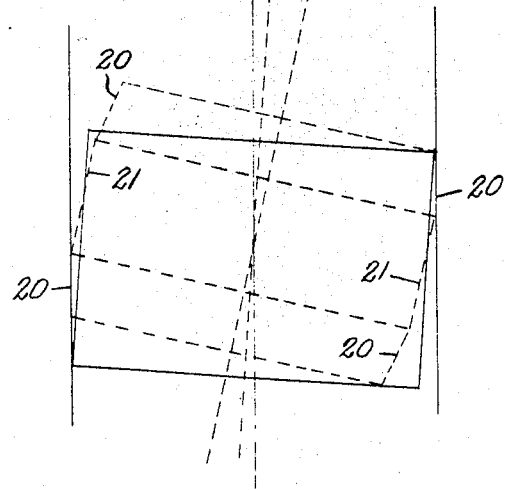
Fig. 4
INVENTOR
Percy R. Drenning
John Milton Lester
ATTORNEY

UNITED STATES PATENT OFFICE 1,996,644

BOLSTER FOR PLANKLESS TRUCKS

Percy R. Drenning, Baltimore, Md., assignor to T. H. Symington & Son, Inc., Baltimore, Md., a corporation of Maryland Application August 25, 1931, Serial No. 559,289

9 Claims. (Cl. 105—230)

The invention relates to railway car trucks and has special reference to the bolsters thereof.

The principal object of the invention, generally stated, is to provide a novel and improved bolster for railway car trucks, particularly for use in or to form a part of a truck of that type in which the spring plank is eliminated, for example as disclosed in the co-pending application of Thomas H. Symington for patent for Railway car trucks, filed July 31st, 1930, Serial No. 472,116.

Generally speaking and by way of introduction, it should be remembered that by eliminating the spring plank a railway car truck can be greatly reduced in weight and the cost can be decreased owing to the fact that there is one less part necessary. Furthermore by eliminating the spring plank there is no danger of cocking or tilting the side frames with respect to each other as the result of manufacturing variations in the length of bolsters supposed to be uniform in size. In addition, the elimination of the spring plank makes it possible to use a bolster of greater depth than what is considered the A. R. A. standard so that greater strength with less weight may be had. Of course with the elimination of the spring plank it is quite apparent that the bolster then becomes the only element which holds the side frames square. It is therefore proper that the bolster be made sufficiently strong to take any twisting strains which might come upon it, that its column engaging lugs be increased in area to give a greater bearing against the side frame for reducing the wear, and that adequate means be provided cooperating with the side frame and the bolster for holding them in the proper relative positions. These features are discussed in said co-pending application but are repeated here for the sake of clearness.

Moreover, in a truck in which the spring plank is eliminated reliance must be placed entirely on the coaction between the truck bolster and the column guides of the side frame to effect proper squaring under different conditions and at all times. Clearly undue twisting strains upon the truck bolster should be avoided such as might occur when either pair of wheels of the truck happen to drop into a low spot in the track. Undue looseness must be avoided while the squaring action must be maintained. It is with all of the foregoing facts and particularly the last mentioned conditions in view that I have devised the present invention which has for a most important object the provision of a truck bolster having its end portions of novel formation whereby to insure proper squaring of the truck with respect to the side frames even though the bolster be twisted with respect to the side frames as when either pair of wheels drops into a low spot in the track.

Another important object, and more specific one, is to provide a truck bolster in which the ends thereof are chamfered or beveled off at the corners so that even though the maximum twisting effect or action should occur there will still be flat surfaces on the bolster adapted to engage the column guides for maintaining the squared relation of the bolster to the side frames.

Another object of the invention is to provide a bolster which, if made of a depth which will not cause it to interfere with the spring plank, may be used in an ordinary type of truck in which the spring plank is not eliminated.

Yet another object is to provide a bolster which will not cost more to produce than one of ordinary design and which in addition to the points of advantage above stressed will be a distinct improvement in the art.

To the attainment of the foregoing and other objects and advantages, the invention preferably consists in the detailed construction and arrangement to be hereinafter more fully described and claimed, and illustrated in the accompanying drawings in which:

Figure 1 is a top plan view of a portion of a bolster constructed in accordance with my invention, one end being broken away as both are the same, Figure 2 is an end elevation, Figure 3 is a somewhat rough illustration showing a side elevation of a truck embodying a bolster constructed in accordance with my invention, one wheel being represented as dropped down into a low spot in a rail, and Figure 4 is a diagrammatic view showing a difference in the canting action of my bolster as compared with one of ordinary type.

Referring more particularly to the drawings I have shown the bolster as conforming in some respects to the usual practice in so far as the general construction is concerned, the features of radical departure being a matter of contour in respects to be pointed out. This bolster is formed in one piece as a casting and comprises an elongated body including a top wall 10, a bottom 11 and sides 12. The top 10 of course constitutes a compression member while the bottom 11 constitutes a tension member. The top 10 is provided with a center bearing which may be the usual upstanding circular flange 13 and which is adapted to receive and cooperate with the ordinary type of center plate which depends from the body bolster, not shown. The bolster is of maximum depth at its center and the bottom 11 inclines or slopes upwardly from the center to the end portion 15 which is consequently of much less depth so as to conform substantially to the general standard and so that the usual nest of truck springs, not shown, may be engaged beneath the end within the window opening of the side frame, not shown. Other details in regard to the cooperation of the bolster with the side frame will be given later on.

At its center the bolster is preferably of greater depth than the standard, this being permissible for the reason that in a truck in which the spring plank is eliminated the increased depth will not cause any interference such as would take place if a plank were present.

It is intended that the bolster be equipped with side bearings of conventional design and though they are not illustrated, the bolster is shown as provided in its top with a plurality of holes 16 for the reception of whatever securing elements, generally rivets, are used for mounting the side bearings. The bolster is of course intended to traverse the space between the truck side frames with its ends 15 received within the usual window openings so as to be supported by the nests or clusters of springs. The opposite sides of the bolster are therefore formed with laterally projecting lugs 17 backed up by inclined brace webs 18 and adapted to cooperate with the inner faces of the side frames for the purpose of preventing the bolster from shifting longitudinally. As this bolster is intended primarily for use in a truck in which the ordinary spring plank is eliminated it is preferable that these lugs be of greater size than customary so as to increase the bearing area and consequently reduce the wear on the column guides and on the lugs themselves.

For assisting in taking the lateral or end thrust and also to insure the proper squared relation of the bolster with respect to the side frames, recourse may be had to the same scheme of construction and arrangement disclosed in said co-pending application, that is to say there is a transverse retaining member 19 extending through each projecting outer end of the bolster and cooperating with the outer side of the side frame.

The bolster is intended particularly for use in the type of truck shown in the above-mentioned co-pending application and it will be seen that the truck may be constructed simply of three parts, namely the two side frames and the bolster, the transverse members 19 being considered a part of the former. The advantages of eliminating the spring plank have been carefully pointed out in said co-pending application and need not be herein repeated. Omitting the spring plank makes it possible to use a bolster of much greater depth or height than is ordinarily the case and it is for this reason that I have shown my improved bolster as of much greater depth at its center, the depth being in fact so great that if a spring plank were used it would interfere with the bolster. Of course the height might be reduced so that the bolster could be used in a truck in which the spring plank is present, as this single feature does not detract from the other advantages of my bolster construction.

At least most of the above features have been discussed in said co-pending application. The essential feature of novelty in the present case which does not exist in the co-pending one is the particular and peculiar formation of the ends of the bolster where they coact with the column guides which form part of the side frames. This particular feature is clearly illustrated in the drawings wherein it will be observed that the corners of the end portions of the bolster are beveled off or chamfered at 20 so as to permit the bolster to cock or cant within the window opening without bringing about any unusual degree of pressure between the edge portions of the bolsters and the confronting faces of the column guides. The degree of chamfering need not of course be very great as it will not require any great angle to relieve the strain which would otherwise occur at these particular points. If a loose fit between the bolster and the column guides were permissible this expedient would be unnecessary but as reliance is placed upon the coaction between the bolster and the side frame for effecting and maintaining squaring at all times there cannot be any appreciable looseness, a condition which makes it substantially imperative to provide relief at the longitudinal corners. This chamfering reduces the effective height of the parallel sides 21 of the bolster. However, the effective width is not destroyed as there is the normal distance between the parallel sides 21. By referring to the diagram, Figure 4, the rocking or canting action will become readily apparent. Considering the ordinary truck having its bolster fitting snugly in the window opening, in the event that a wheel drops into a relatively low joint, the side frame at this end of the truck will also drop. This side frame can drop only as far as the clearance in the bolster fit will permit torsional movement around the axis of the bolster. It therefore can be readily seen that it is possible to entirely unload this wheel, the other three then carrying the entire load. Of course, before this has occurred, the wheel mentioned would lift because the entire load would be concentrated at the opposite wheel and as this load is applied to the opposite wheel through the journal a fulcruming action would take place and lift of the first mentioned wheel would occur. The reason this does not occur in the conventional type of truck is because the fit of the bolster within the side frame is loose and provides sufficient flexibility to be adequate for all practical purposes. However, in a truck where it is necessary to maintain a relatively tight fit of the bolster within the window openings it is apparent that more allowance must be made for vertical equalization of the side frames with respect to the bolster. All the desired results have been accomplished by my specific construction wherein the bolster is chamfered. Attention is also called to the fact that even though the height of the actual bearing surfaces at the sides of the bolster is reduced this is more than offset by the fact that the length of the bearing has been increased so as to correspond with the increase in the width of the column guides as set forth in said co-pending application.

From the foregoing description and a study of the drawings it is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a plankless truck, the combination of side frames having window openings defined between column guides, a bolster having its ends projecting within said window openings, coacting means on the end portions of the bolster and the column guides for preventing movement of the bolster laterally with respect to the side frames, the end portions of the bolster fitting snugly within the window openings, and means enabling the bolster to cant with respect to the side frames while maintaining the snugness of the fit comprising angularly related surfaces on the column guide engaging portion of the bolster, said surfaces providing flat area contact at the normal and maximum canted positions of the bolster.

2. In a plankless truck, the combination of side frames having window openings defined between column guides, a bolster having its ends projecting within said window openings, coacting means on the end portions of the bolster and the column guides for preventing movement of the bolster laterally with respect to the side frames, the end portions of the bolster fitting snugly within the window openings, and means enabling the bolster to cant with respect to the side frames while maintaining the snugness of the fit, said means comprising inclined surfaces formed on the bolster engageable with the sides of the window opening and providing area contact at the normal and maximum canted positions of the bolster.

3. In a plankless truck, the combination of side frames having window openings defined between column guides, a bolster having its ends extending through and fitting snugly within the window openings, the end portions of the bolster having parallel bearing surfaces of reduced height located between inclined surfaces having the same distance between them as the distance between the parallel surfaces, said parallel and inclined surfaces providing area contact with the column guides at the normal and maximum canted positions of the bolster.

4. A truck of the plankless type comprising the combination of side frames formed with window openings, a bolster having its ends projecting through said window openings and having its longitudinal edges beveled off to define parallel vertical bearing surfaces at opposite sides of less than usual height and inclined bearing surfaces, the distance between the opposite inclined surfaces and the distance between the parallel surfaces being the same, the parallel or the inclined surfaces being engageable with the faces of the window opening to provide area contact at the normal and maximum canted positions of the bolster.

5. In a railway car truck of the plankless type, the combination of side frames formed with window openings, a truck bolster having its ends extending through the window openings and fitting snugly therein, each end portion of the bolster having its opposite sides formed with parallel bearing surfaces of less than usual height, and having its longitudinal corners chamfered off to define upwardly and downwardly converging bearing surfaces leading respectively from the upper and lower edges of said parallel surfaces to enable the bolster to have torsioned movement within the window openings without destroying the snug fit and without destroying area contact at the normal and maximum canted positions of the bolster.

6. In a railway car truck of the plankless type, the combination of side frame having window openings, a bolster having its ends fitting snugly within said window openings, and means for relieving pressure between the bolster and the sides of the window opening upon torsional movement of the bolster with respect to the side frames, said means comprising opposite equidistant angularly related faces on the bolster within the confines of and coacting with the sides of the window opening for providing area contact at the normal and maximum canted positions of the bolster.

7. In a railway car truck, the combination of side frames formed with window openings, a truck bolster having its ends extending through the window opening and fitting snugly therein, each end portion of the bolster having its opposite sides formed parallel with the co-acting column guide faces and having bearing surfaces of less than usual height and length greater than customary, and having its longitudinal corners chamfered off to define upwardly and downwardly converging bearing surfaces leading respectively from the upper and lower edges of said surfaces to enable the bolster to have reasonable torsional movement within the window openings without destroying the snug fit and area contact at the normal and maximum canted positions of the bolster.

8. In a railway car truck of the plankless type, the combination of side frames having window openings defined between spaced column guides, a bolster having its ends fitting snugly within said window openings, and means for relieving pressure between the bolster and the column guides upon torsional movement of the bolster with respect to the side frames, said means comprising flat parallel vertical surfaces at the intermediate portions of the column guide engaging faces of the bolster, and upwardly and downwardly converging surfaces extending respectively from the upper and lower edges of said parallel surfaces and adapted for engagement with the column guides when the bolster is twisted or rotated longitudinally with respect to the side frames whereby area contact will be maintained at the normal position of the bolster and also at the maximum twisted position thereof.

9. In a railway car truck of the plankless type, the combination of side frames having window openings defined between spaced column guides, a bolster having its ends fitting snugly within said window openings, and means for relieving pressure between the bolster and the column guides upon torsional movement of the bolster with respect to the side frames, said means comprising flat parallel vertical surfaces at the intermediate portions of the column guide engaging faces of the bolster, and upwardly and downwardly converging surfaces extending respectively from the upper and lower edges of said parallel surfaces and adapted for engagement with the column guides when the bolster is twisted or rotated longitudinally to its maximum extent with respect to the side frames whereby area contact will be maintained at the normal position of the bolster and also at the maximum twisted position thereof, the parallel surfaces being of materially greater extent than said converging surfaces.

PERCY R. DRENNING.